Dec. 13, 1966  M. FRIEDEL  3,291,020
PHOTO PRINTING AND PHOTO PROCESSING DEVICE
Filed May 8, 1964  17 Sheets-Sheet 1

INVENTOR.
MURRAY FRIEDEL
BY Albert F. Kronman
ATTORNEY

Dec. 13, 1966    M. FRIEDEL    3,291,020
PHOTO PRINTING AND PHOTO PROCESSING DEVICE
Filed May 8, 1964    17 Sheets-Sheet 2

INVENTOR.
MURRAY FRIEDEL
BY Albert F Kronman
ATTORNEY

Dec. 13, 1966    M. FRIEDEL    3,291,020
PHOTO PRINTING AND PHOTO PROCESSING DEVICE
Filed May 8, 1964    17 Sheets-Sheet 3

INVENTOR.
MURRAY FRIEDEL
BY Albert F. Kronman
ATTORNEY

Dec. 13, 1966 M. FRIEDEL 3,291,020
PHOTO PRINTING AND PHOTO PROCESSING DEVICE
Filed May 8, 1964 17 Sheets-Sheet 4
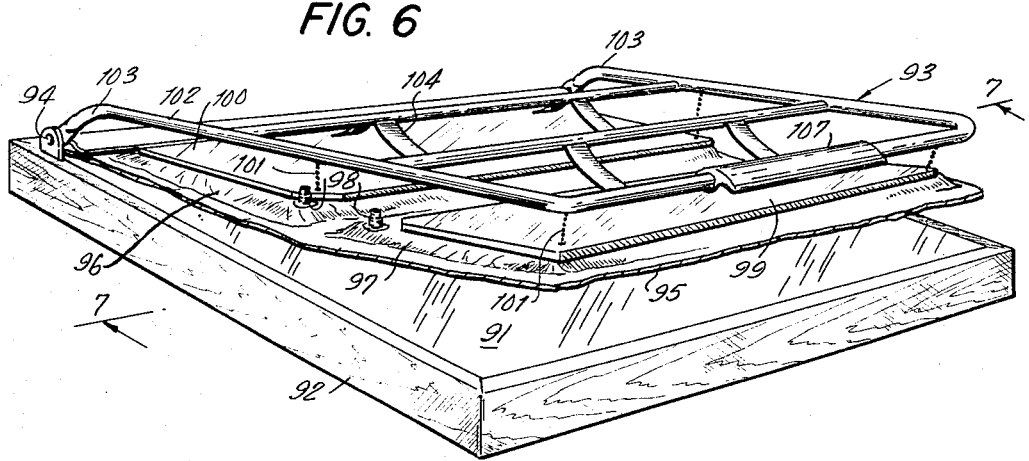
FIG. 6
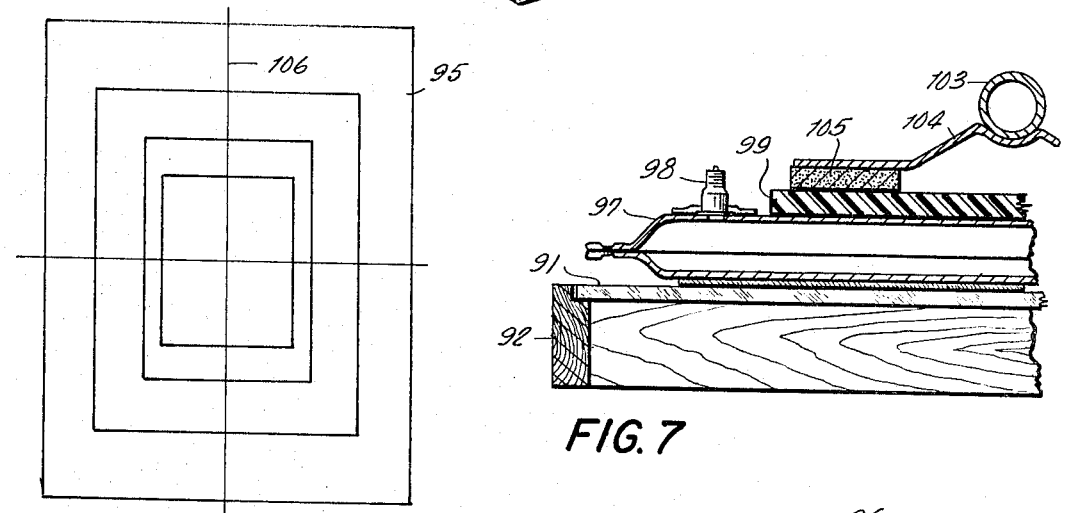
FIG. 8
FIG. 7
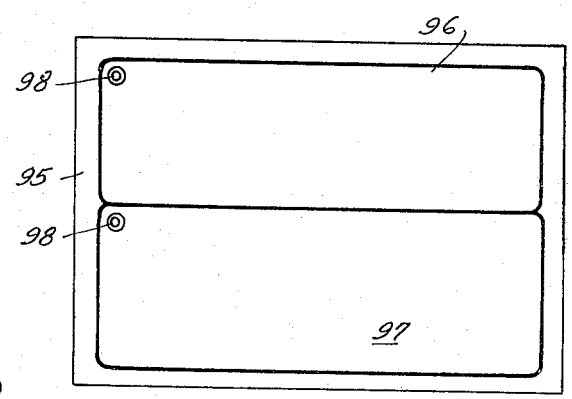
FIG. 9
INVENTOR.
MURRAY FRIEDEL
BY Albert F. Kohrman
ATTORNEY Dec. 13, 1966 M. FRIEDEL 3,291,020
PHOTO PRINTING AND PHOTO PROCESSING DEVICE
Filed May 8, 1964 17 Sheets-Sheet 5

INVENTOR.
MURRAY FRIEDEL
BY Albert F Kronman
ATTORNEY

INVENTOR.
MURRAY FRIEDEL

Dec. 13, 1966  M. FRIEDEL  3,291,020
PHOTO PRINTING AND PHOTO PROCESSING DEVICE
Filed May 8, 1964  17 Sheets-Sheet 7
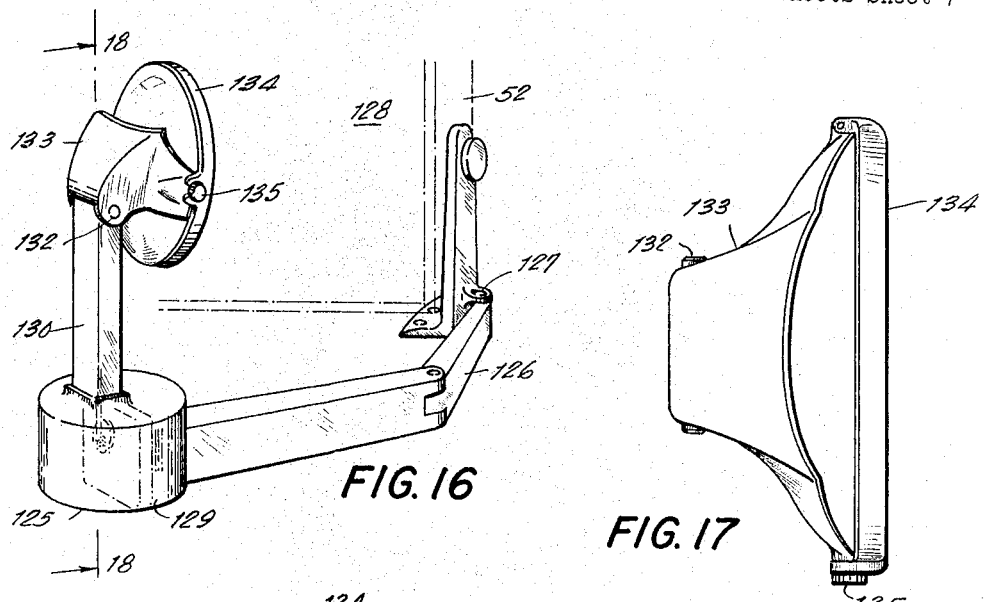
FIG. 16
FIG. 17
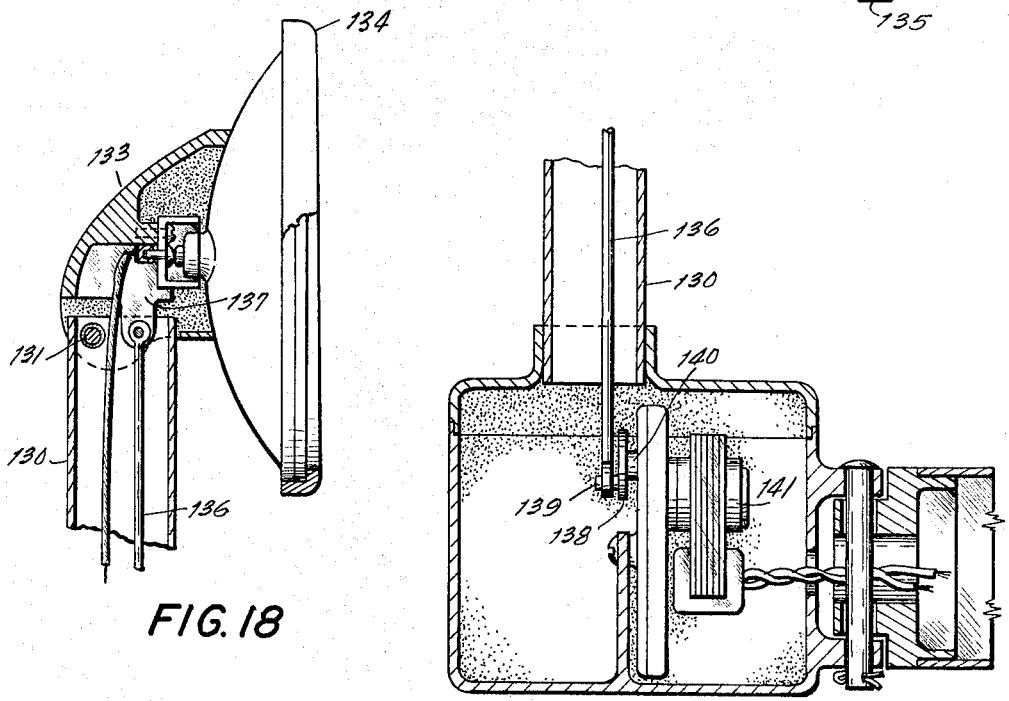
FIG. 18
FIG. 19
INVENTOR.
MURRAY FRIEDEL
BY Albert F. Kronman
ATTORNEY Dec. 13, 1966  M. FRIEDEL  3,291,020
PHOTO PRINTING AND PHOTO PROCESSING DEVICE
Filed May 8, 1964  17 Sheets-Sheet 10

INVENTOR.
MURRAY FRIEDEL
BY Albert F. Kronman
ATTORNEY

Dec. 13, 1966  M. FRIEDEL  3,291,020
PHOTO PRINTING AND PHOTO PROCESSING DEVICE
Filed May 8, 1964  17 Sheets-Sheet 11
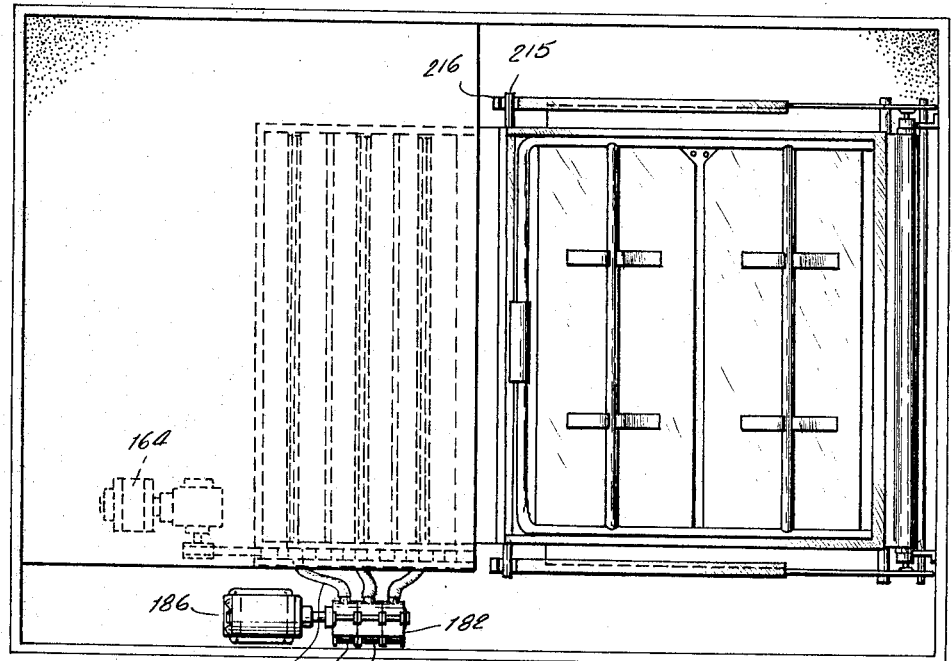
FIG. 25
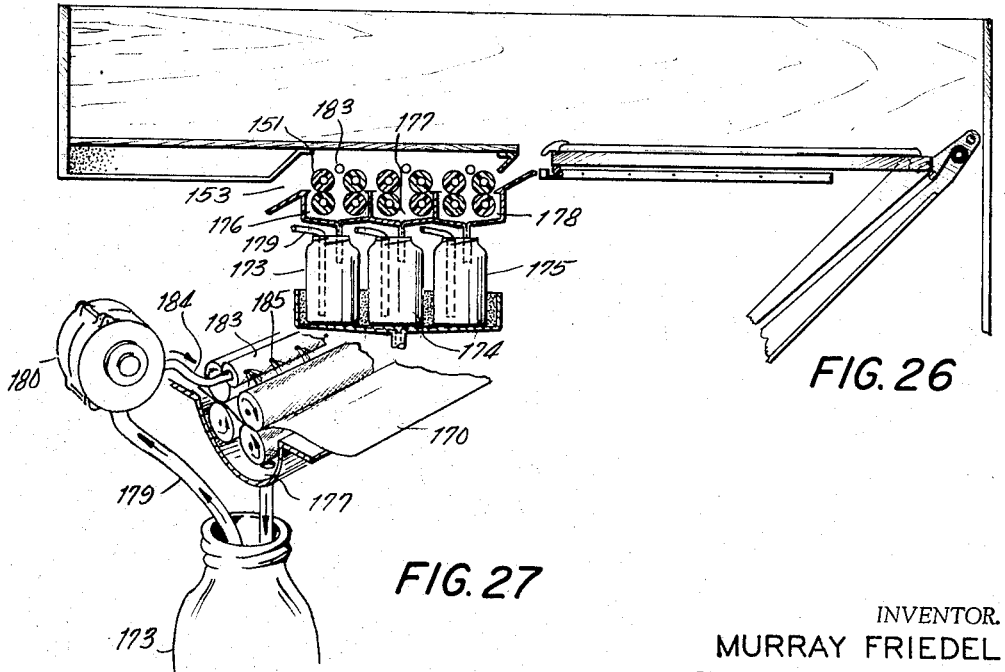
FIG. 26
FIG. 27
INVENTOR.
MURRAY FRIEDEL
BY Albert F. Kronman
ATTORNEY Dec. 13, 1966  M. FRIEDEL  3,291,020
PHOTO PRINTING AND PHOTO PROCESSING DEVICE
Filed May 8, 1964  17 Sheets-Sheet 12

INVENTOR.
MURRAY FRIEDEL
BY Albert F. Kronman
ATTORNEY

Dec. 13, 1966  M. FRIEDEL  3,291,020
PHOTO PRINTING AND PHOTO PROCESSING DEVICE
Filed May 8, 1964  17 Sheets-Sheet 13
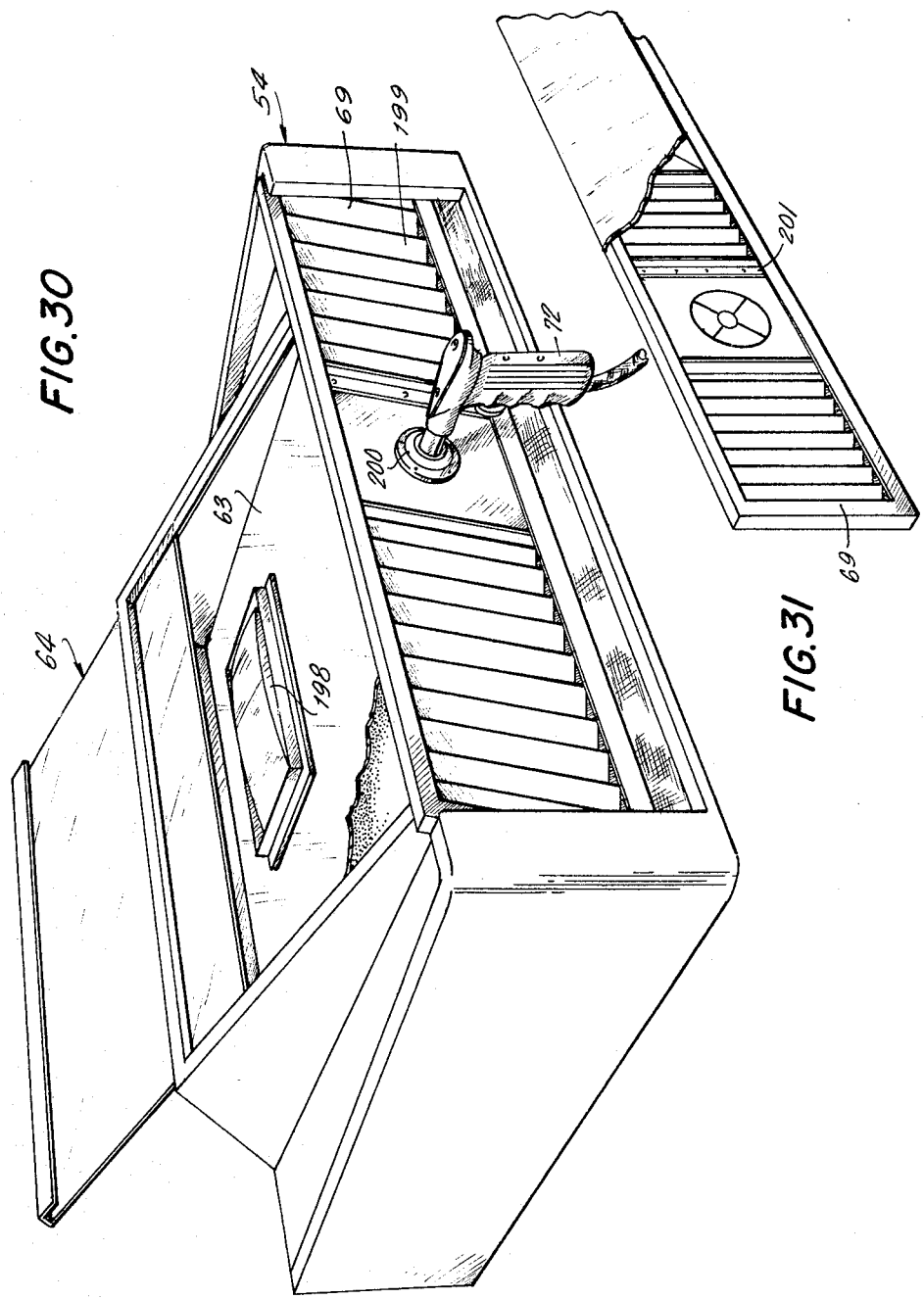
INVENTOR.
MURRAY FRIEDEL
BY Albert F Krouman
ATTORNEY Dec. 13, 1966                  M. FRIEDEL                  3,291,020
PHOTO PRINTING AND PHOTO PROCESSING DEVICE
Filed May 8, 1964                                        17 Sheets-Sheet 14
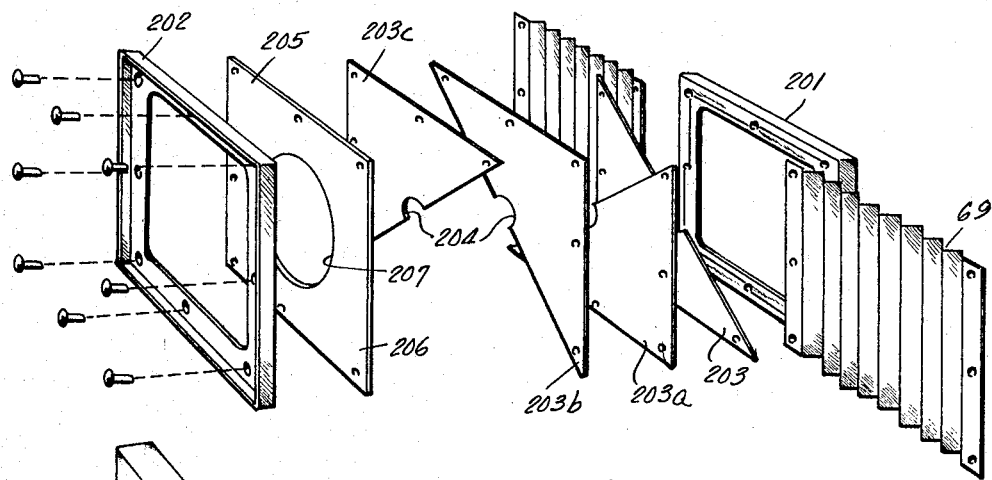
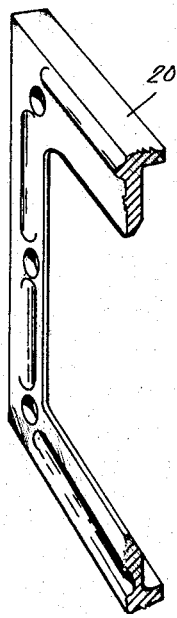
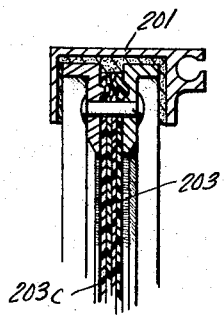
INVENTOR.
MURRAY FRIEDEL
BY Albert F. Kronman
ATTORNEY Dec. 13, 1966   M. FRIEDEL   3,291,020
PHOTO PRINTING AND PHOTO PROCESSING DEVICE
Filed May 8, 1964   17 Sheets-Sheet 15

INVENTOR.
MURRAY FRIEDEL
BY Albert F Kronman
ATTORNEY

Dec. 13, 1966    M. FRIEDEL    3,291,020
PHOTO PRINTING AND PHOTO PROCESSING DEVICE
Filed May 8, 1964    17 Sheets-Sheet 16

INVENTOR.
MURRAY FRIEDEL
BY Albert F. Kronman
ATTORNEY

Dec. 13, 1966  M. FRIEDEL  3,291,020
PHOTO PRINTING AND PHOTO PROCESSING DEVICE
Filed May 8, 1964  17 Sheets-Sheet 17

INVENTOR.
MURRAY FRIEDEL
BY *Albert F. Kronman*
ATTORNEY

United States Patent Office 3,291,020
Patented Dec. 13, 1966

3,291,020
PHOTO PRINTING AND PHOTO
PROCESSING DEVICE
Murray Friedel, North Miami Beach, Fla., assignor to
Visual Graphics Corp., New York, N.Y., a corporation
of New York
Filed May 8, 1964, Ser. No. 365,926
2 Claims. (Cl. 95—13)

This invention relates to photocopying and photoprinting devices and more particularly to a self-contained camera, photoprinting and processing machine.

In the practice of commercial lithography, photocopying and photoprinting, it becomes necessary to resort to a wide variety of operations in order to produce the many different results desired. Heretofore, such operations were carried out by resort to a wide variety of machines, cameras, apparatus, dark rooms and the like. Large amounts of room were required for such equipment and a substantial investment. In addition, the operator spent much of his time in moving from one place to another in order to complete a specific task. Sensitized paper or film was processed in a dark room to which it had to be taken.

Accordingly, it is an object of the present invention to provide a single machine capable of carrying out a wide variety of photocopying and photoprinting operations.

Another object of the present invention is to provide a photocopying and photoprinting machine which will occupy a minimum amount of space and eliminate the need for a dark room.

A further object of the present invention is to provide a photocopying and photoprinting machine of extreme flexibility and versatility.

Still another object of the present invention is to provide a machine compact enough to be moved about from one working location to another and which does not require connection to a water supply.

A feature of the present invention is its novel paper handling mechanism whereby light sensitive paper or film may be transported within the machine during the photographic operations.

Another feature of the present invention is the provision of a window through which the paper may be observed as it is being processed.

A further feature of the present invention is its film or paper processing apparatus which is entirely contained within the machine.

A feature of the present invention is its novel copy holder and copy illuminating operations.

Still another feature of the present invention is its simplified control means for operating the device from a single position.

A feature of the present invention is its novel image reproportioning unit.

A further feature of the present invention is its self-adjusting pressure platen for holding the sensitive paper or film at the focal plane.

A feature of the present invention is its manual ready access curtain whereby the light sensitive paper or film within the machine may be manipulated without recourse to a dark room.

Still another feature of the present invention is its novel film or paper processing apparatus whereby materials having a long shelf life can be exposed and developed in a minimum of time.

The invention consists of the construction, combination and arrangement of parts, as herein illustrated, described and claimed.

In the accompanying drawings, forming a part hereof, there are illustrated several forms of embodiment of the invention, in which drawings, similar reference characters designate corresponding parts, and in which:

FIGURE 6 is a somewhat isometric view on an enlarged scale of the focal plane film or paper holding assembly.

FIGURE 7 is a fragmentary view in cross section taken on line 7—7 in FIGURE 6, looking in the direction of the arrows.

FIGURE 8 is a top plan view of the composing screen shown in FIGURES 6 and 7.

FIGURE 9 is a top plan view of the pressure applying members of the film holding assembly shown in FIGURE 6.

FIGURE 16 is a somewhat isometric view on an enlarged scale of the copy holder light shown in FIGURE 1.

FIGURE 17 is a top plan view of the light shown in FIGURE 16.

FIGURES 18 and 19 are fragmentary sectional views taken on line 18—18 in FIGURE 16.

FIGURE 25 is a top plan view of another form of film or paper developing apparatus according to the present invention.

FIGURE 26 is a cross sectional view of the apparatus shown in FIGURE 25.

FIGURE 27 is a fragmentary view of still another form of paper or film developing apparatus.

FIGURE 30 is a somewhat isometric view somewhat enlarged of the paper handling station of the present invention, showing a further embodiment.

FIGURE 31 shows another form of front panel for the paper handling station.

FIGURE 32 is an exploded view of the panel shown in FIGURE 31 taken from the rear thereof.

FIGURE 33 is an isometric view partly in cross section and on an enlarged scale of the rear frame shown in FIGURE 32.

FIGURE 34 is a fragmentary view in vertical cross section of the manual access structure shown in FIGURES 31 and 32.

As used herein, the term light sensitive paper includes light sensitive materials of every type, including film, foils, coated glass plates, etc.

The term camera is used herein to include any light receiving image focusing device for producing photocopies, photoprints, color transparencies, offset plates, etc.

Figure 1:
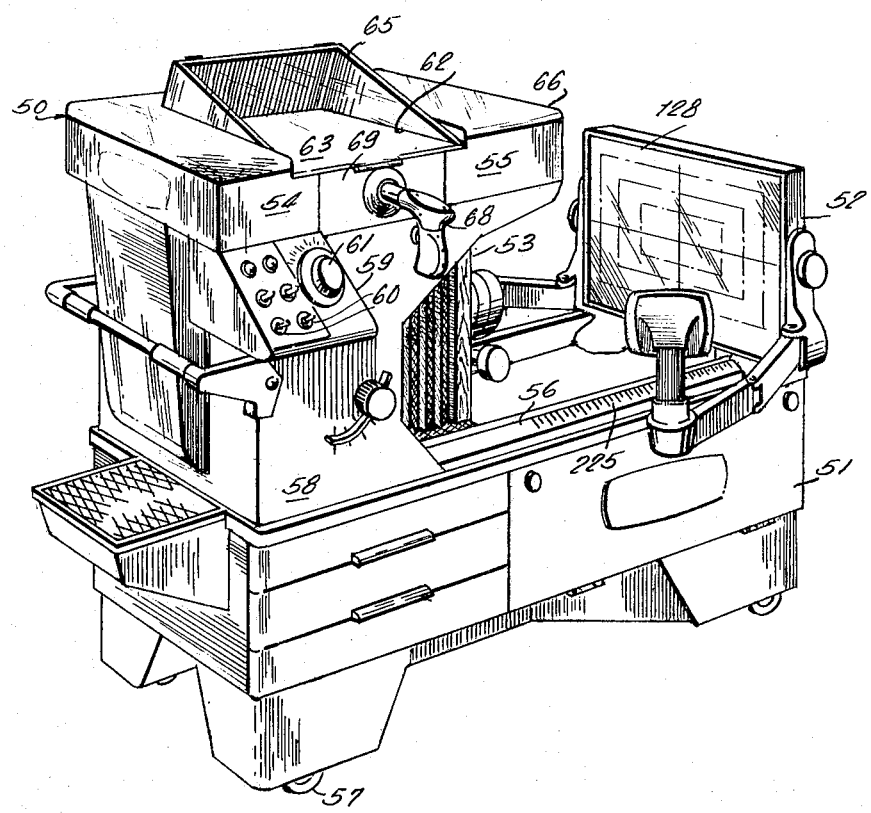
FIGURE 1 is a somewhat isometric view of a complete embodiment of the present invention.
Figure 2:
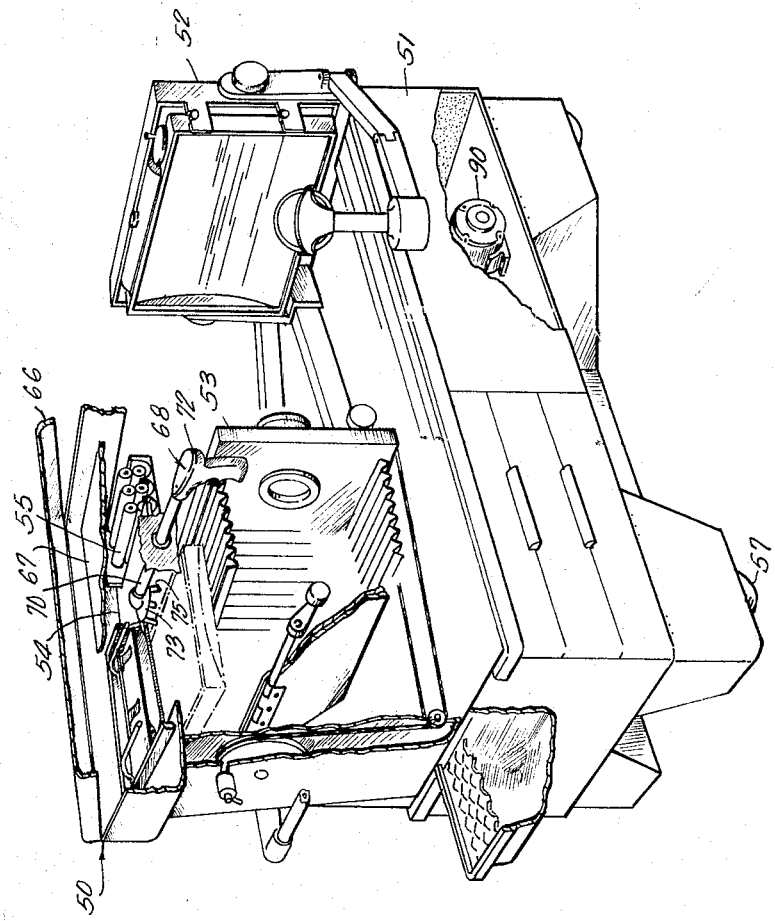
FIGURE 2 is a view similar to FIGURE 1 with certain parts cut away to show the interior structure thereof.

Referring to the drawings and particularly to FIGURES 1 and 2, 50 indicates a complete photocopying and photoprinting device made in accordance with the present invention. The device 50 broadly comprises a bed or base 51 having a copy holding station 52 at one end thereof and at the opposite end a combined camera 53, paper handling station 54 and paper processing or developing station 55. The bed 51 is provided with elongated ways 56 upon which the copy holding station 52 slides in a manner hereinafter more fully set forth.

The device 50 is mounted upon wheels 57 and may be moved from room to room or from one work station to another, as desired. Since it is a self-contained unit, no exterior source of water is required. Only an electrical outlet is necessary to operate the device 50.

A housing 58 is provided around the camera 53, the paper handling and paper developing stations 54, 55. A control panel 59 is secured to the front of the housing 58 and contains light and motor switches 60 and a timer dial 61. The top of the housing 58 is formed with a rectangular opening 62 through which the operator can see the interior of the housing 58 and particularly the paper handling and processing stations. The opening 62 is covered by a suitable light filter such as a transparent ruby filter 63 so that ambient room light will not expose the sensitive paper while the operator is looking into the machine. Where paper sensitive to a wide band of light frequencies is employed, as in the production of color transparencies, an opaque slide 64 (best shown in FIGURE 30) is slipped into the hood 65 to cover the opening 62. The top 66 of the housing 58 is hinged as shown in FIGURE 2 for reloading, servicing and other operational purposes.

Figure 4:
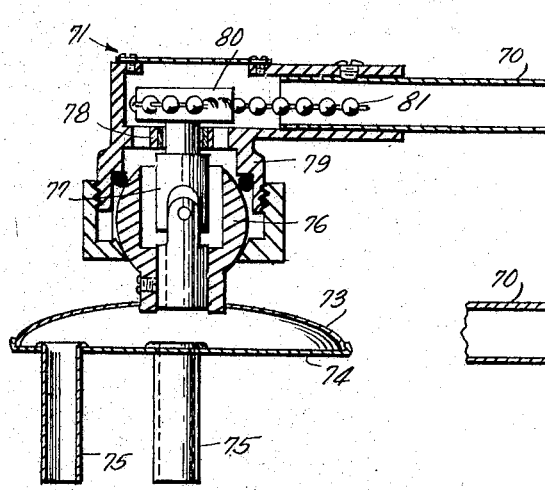
FIGURE 4 is a fragmentary view in longitudinal section of the head of the paper handling device shown in FIGURE 3.
Figure 5:
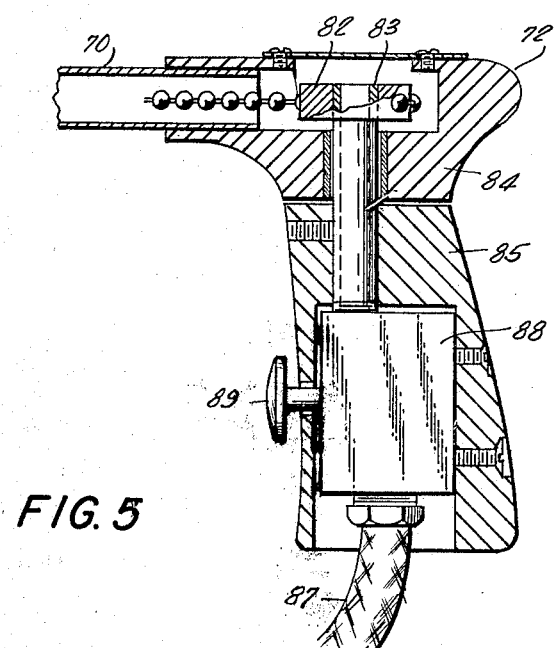
FIGURE 5 is a fragmentary view in longitudinal section of the control handle portion of the paper handling device.

One or more shelves 67 are provided within the paper handling station 54 to hold a supply of light sensitive paper (not shown). The paper is moved from the shelves 67 to the focal plane of the camera 53 by a material selecting arm 68 shown in FIGURES 1 and 2 and in more detail in FIGURES 3, 4, and 5. The arm 68 is carried by a panel 69 on the front of the housing 58. The panel 69, hereinafter more fully described, permits the arm 68 to be moved from right to left and up and down without allowing room light to enter the camera.

Figure 3:
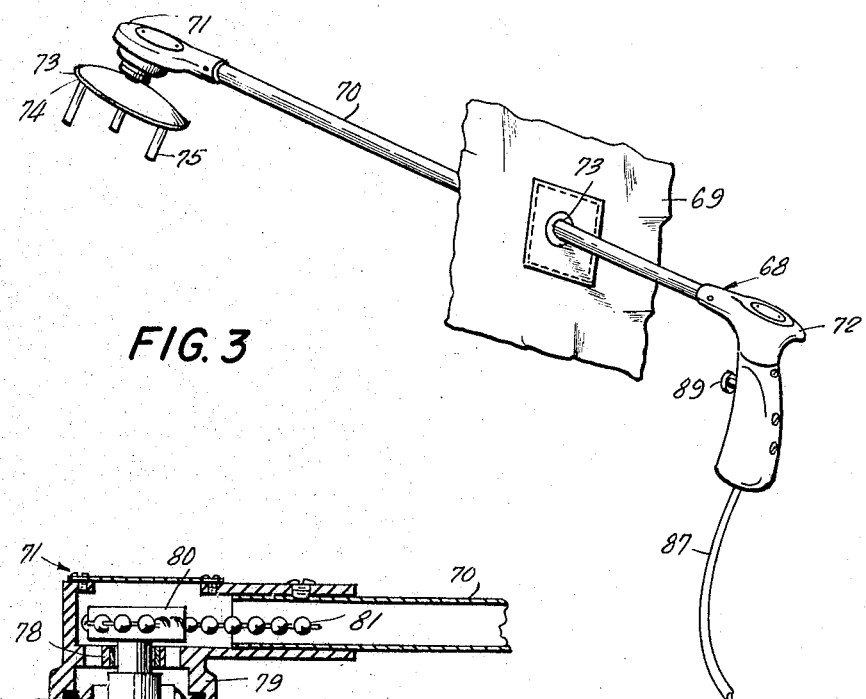
FIGURE 3 is a somewhat isometric view, on an enlarged scale, of the paper handling device shown in FIGURES 1 and 2.

The arm 68, as shown in FIGURE 3, consists of an elongated tubular member 70 having a material handling head 71 at one end thereof and an operating handle 72 at the opposite end. The tubular member 70 extends through a suitable light proof opening 73 in the panel 69.

The material handling head 71 has at its extremity, a dome 73 sealed across its bottom by a plate 74. A plurality of short tubes 75 are carried by the plate 74 and extend downwardly therefrom. The tubes 75 are in communication with the interior of the dome 73. The dome 73 is coupled to the elongated tube 70 by a ball and socket-type swivel 76 which permits it to move in any direction. A universal coupling 77 is secured at its lower end to the swivel ball and is journaled at its upper end within a bearing 78 carried within the housing 79 of the head 71. A pulley 80 is secured to the upper end of the coupling 77. The pulley 80 is driven by a bead chain 81. The bead chain 81 is also led around a second pulley 82 which is secured to a hollow shaft 83 freely carried in the upper portion 84 of the handle 72. The shaft 83 is secured to the lower portion 85 of the handle 72 by the set screw 86. It will be seen that rotary motion imparted to the lower part 85 of the handle 72 will result in a rotation of the head dome 73.

A vacuum pump 90 (shown in FIGURE 2) is connected to the material handling head 71 by means of the flexible conduit 87. A valve 88 and valve operating button 89 are provided to control the vacuum. The material handling arm 68 is formed with passages through the shaft 83, the tubular portion 78 and the universal coupling 77 so that the air in the dome 73 and tubes 75 can be evacuated by the operation of the button 89.

When it is desired to move a sheet of sensitized paper from the shelf 67 into position for exposure, the operator grasps the handle 72 of the material selecting arm 68 and swings the head 71 so that the pick up tubes 75 come to rest upon the topmost sheet. The swivel 76 will cause all of the tubes 75 to touch the surface. The valve button 89 is then pressed and the air within the arm 68 evacuated. Thereafter, the paper can be lifted by the arm 68 and swung into position on the focal plane of the camera. Orientation of the paper is accomplished by turning the bottom portion 85 of the handle 72. With the sensitive sheet in place, the valve button 89 is released to cut off the vacuum. The paper will then be free of the handling head 71. The handling and positioning of the paper can be observed through the filter window 63.

When the sensitized paper is moved into position for exposure it is placed upon a sheet of glass 91 disposed in the focal plane of the camera (see FIGURE 6). The glass 91 is carried within a frame 92. A pneumatic pressure platen 93 is swingably secured to the frame 92 as indicated at 94 in FIGURE 6. The pressure platen 93 consists of a frosted focusing composing screen 95 having fine Fresnel field lens lenticulations. Two rectangular transparent plastic bags 96, 97 are bonded to the screen 95. The bags 96, 97 are filled with air through valves 98. A rectangular rigid transparent plate 99, 100 is cemented or bonded to the top of each of the bags 96, 97 respectively. The plates are secured in turn by means of small bead chains 101 to a tubular bracket 102. The bracket 102 is swingably secured to the pivot point 94 at its inner ends 103. Spring leaves 104 attached to the under side of the bracket 103 bear against the top of the plates 99, 100 as the bracket is moved down to its closed position. A soft pad 105 is interposed between each of the springs 104 and the plates 99, 100.

As shown in FIGURE 8, the composing screen 95 is provided with hair line indicia 106 to aid in arranging the image as to size and location. The screen 95 can be viewed through the pneumatic pressure platen bags 96, 97 during the focusing and orienting operation. Thereafter, the platen can be raised, the paper placed upon the glass 91, the platen closed and the picture taken.

It will be noted that the construction of the pneumatic pressure platen 93 is such that the forward portion of the screen 95 is raised from the glass 91 while the rear portion of the screen 95 remains substantially in contact with it. As a result, the paper can be slipped between the screen 95 and the glass 91 by the arm 68 while at the same time providing a structure which will grasp the paper and hold it in place when the vacuum to the arm is broken. The substantially transparent structure of the bags 96, 97 and the screen 95 permits the operator to locate the paper in register with the desired hair lines 106 when placing it beneath the platen 93 and on top of the glass 91. Thereafter, the operator can swing the arm 68 on top of the small handle 107 on the bracket 102 and force it downwardly against the tension of the springs (not shown) which normally raise the said bracket from the glass 91. The handle 107 engages a small latch (not shown) on the inside of the frame 92 to hold the assembly together during exposure. After the exposure has been made, the operator can lift the handle 107 to release the latch, whereupon the bracket 102 will spring upwardly, permitting the paper to be withdrawn by means of the arm 68. The paper so removed is then ready for processing in the manner hereinafter more fully set forth.

Figure 10:
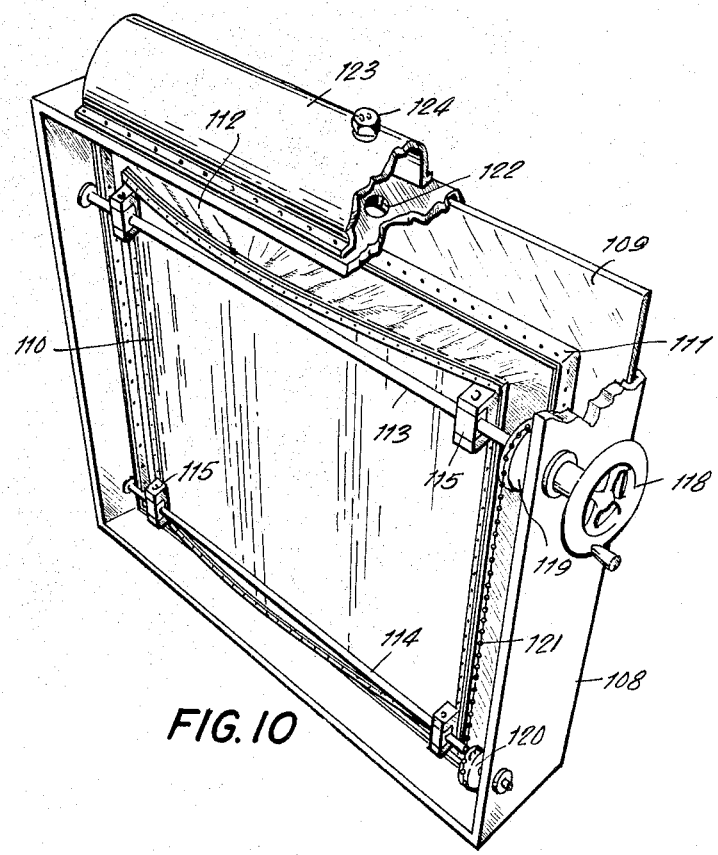
FIGURE 10 is a somewhat isometric view partially cut away of a reproportioning lens arrangement in accordance with the present invention.

The present invention is capable of a wide variety of effects and operations. One such operation is reproportioning. In FIGURES 10-15, there is shown one of the reproportioning devices employed. The reproportioning unit illustrated in FIGURE 10 is built into a box-like frame 108 having a flat transparent sheet of some suitable plastic material, such as Plexiglas 109 on one side thereof and a second sheet of some transparent material 110 spaced from the first sheet 109.

A sealing frame 111 is secured to the outer frame 108 a desired distance from the plastic sheet 109. The sealing frame 111 and sheet 109 are in fluid tight engagement with the frame 108 to provide a tank-like enclosure. The sheet 110 is secured to the sealing frame 111 by means of a suitable flexible material such as rubber or plastic. The flexible material 112 is in fluid-tight engagement with the edges of the transparent sheet 110 and the edges of the sealing frame 111. The flexible sealing sheet, moreover, is sufficiently resilient or provided with sufficient slack material to permit the transparent sheet 110 to be bowed without destroying the fluid-tight seal therebetween. The tank-like enclosure between the sheets 109, 110, is filled with a suitable liquid having the proper index of refraction and clarity such as mineral oil. When the sheet 110 is bowed, light rays passing through the reproportioning device will be bent in the manner of light passing through a lens.

Figure 13:
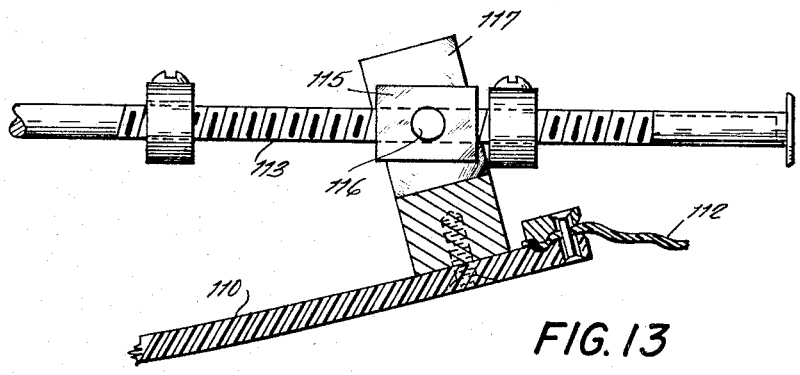
FIGURES 13 and 14 are fragmentary views on an enlarged scale of the screw and nut mechanism for adjusting the reproportioning lens.
Figure 14:
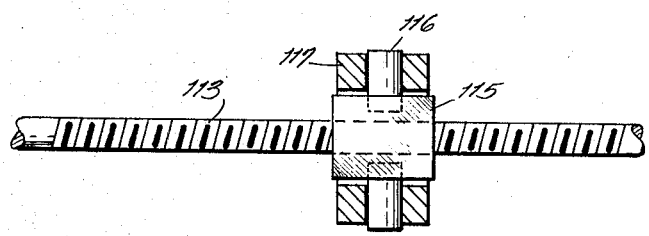

Bowing of the sheet 110 is accomplished by means of the mechanism best shown in FIGURES 10-14. The bowing mechanism consists of a first elongated threaded rod 113 and a second elongated threaded rod 114. The rods 113, 114, are disposed parallel to each other and adjacent opposite edges of the sheet 110, as shown in FIGURE 10. Internally threaded nuts 115 are carried on each of the rods spaced from each end thereof. The nuts 115 are provided with short trunnions 116 which are received within blocks 117 attached to the surface of the sheet 110. The nuts 115 are thus free to swivel within the blocks 117, as illustrated in FIGURE 13. An actuating wheel 118 is secured to the outer end of the rod 113 so that the rod can be rotated. The actuating wheel 118 is located outside of the frame 108 for easy access by the operator. A pulley 119 is secured to the rod 113 adjacent the frame 108 and a second pulley 120 is secured to the rod 114 immediately below the pulley 119, as shown in FIGURE 10. The pulleys are linked together by means of the bead chain 121.

Figure 11:
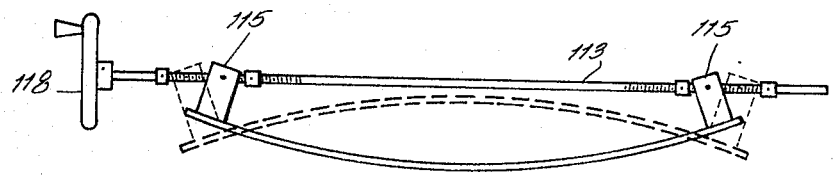
FIGURE 11 is a top plan view of the lens adjusting mechanism shown in FIGURE 10.
Figure 12:
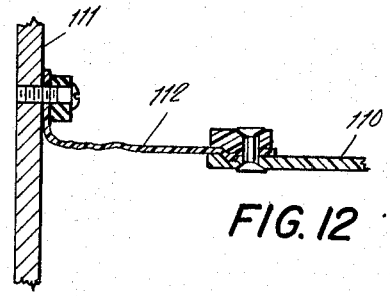
FIGURE 12 is a fragmentary cross sectional view somewhat enlarged, showing the manner in which the fluid is retained within the reproportioning device.

It will be observed that the rotation of the actuating wheel 118 will cause the nuts 115 to move together or apart depending upon the direction of rotation of the threaded rod 113. It is to be understood, of course, that left and right hand threads will be provided on the rods 113, 114 to achieve this purpose. The travel of all four nuts 115 on the rods 113, 114 will operate in unison to bow the sheet 110. Because of the trunnions 116 the sheet 110 can be bowed to form a convex or concave lens, as illustrated in FIGURE 11.

The top of the frame 108 is provided with a small opening 122 through which fluid and air may move. In the event that the bowing of the sheet 110 forces fluid out of the tank-like enclosure, it can escape through the opening 122 into the small reservoir 123 secured to the top of the frame 108.

Figure 15:
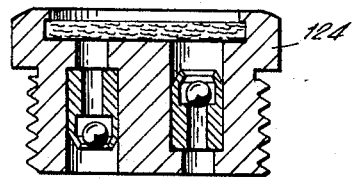
FIGURE 15 is a view in vertical section of the filler cap of the reproportioning lens assembly.

The reservoir 123 is provided with a check valve 124, as shown in FIGURE 15, whereby air can escape from the reservoir 123 and fluid can be added to the system, if desired. It will be apparent that sheet 110 can be bowed in the manner shown in FIGURE 10 or can be bowed horizontally in the manner shown in FIGURE 2 without departing from the spirit of the present invention, the nature of the bowing depending upon the location of the threaded rods 113, 114.

In achieving the reproportioning, the copy (not shown) is placed upon the copy holder 52, illuminated by the lights 125 and the actuating wheel turned until the proper reproportioning of the copy is achieved. The effect of the reproportioning upon the copy may be observed by the operator by looking through the filter 63 in the opening 62 of the housing 58. The screen 95 will serve as a ground glass screen for this purpose.

In illuminating the copy, it is important that a great amount of light be available but that such light does not create "hot spots." The lights 125 shown in FIGURES 1 and 2 and in greater detail in FIGURES 16 through 19, will perform such functions. In addition, the lights 125 are mounted upon segmented arms 126 pivotally secured at 127 to the copy holding station 52, as shown in FIGURE 16. The arms 126 can be swung around in such manner that the lights 125 are directed to the rear of the copy to create a large light box. The copy board 128 is made of a sheet of opal glass and a second sheet of clear glass. A suitable opaque insert such as a layer of black velvet is normally interposed between the opal and clear glass. When using the copy board 128 as a light box, the opaque material will, of course, be withdrawn.

Referring specifically to FIGURES 16 through 19, it will be seen that the lights 125 consist of a base 129 secured to the free end of the arms 126. An upstanding portion 130 is secured at its lower end to the base 129 and is hollow, as indicated in FIGURES 18 and 19. The top of the upstanding portion 130 is suitably bored at 131 to receive a small shaft 132. The shaft 132 acts as a pivot for a light holding bracket 133 carried on the top of the upstanding portion 130. The free end of the bracket 133 is adapted to receive the lamp 134. The lamp 134 is swingably mounted within the bracket 133 upon the stub shafts 135.

Motion is imparted to the lamps 134 by means of an elongated rod 136 secured at one end to a link 137 attached to the lamp 134. The opposite end of the rod 136 is coupled to a cam 138 by means of a pin 139. The cam 138 is secured to the output shaft 140 of a small synchronous motor 141. As the motor 141 is operated, the shaft 140 rotates the cam 138, thereby raising and lowering the rod 136 which in turn swings the lamp 134, raising and lowering the beam to scan the copy upon the copy board 128. The scanning motion of the light beams provides an even illumination for the copy without danger of "hot spots."

Figure 20:
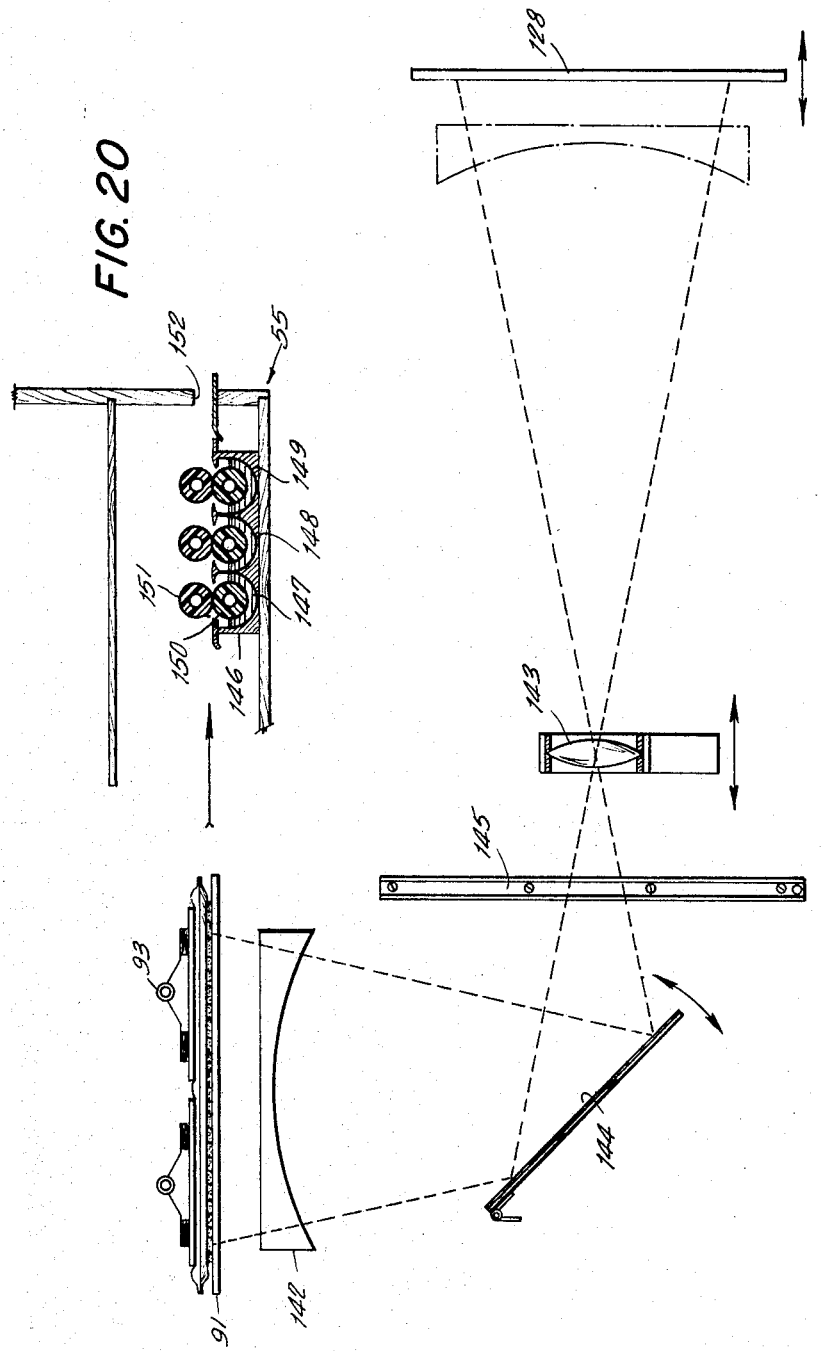
FIGURE 20 is a somewhat diagrammatic view of a complete embodiment of the present invention.

Referring to FIGURE 20, it will be seen that the reproportioning device may also be disposed within the camera, as indicated at 142. In this embodiment, light reflected from the copy board 128 enters the lens 143 of the camera and is directed at the mirror 144 within the camera. The mirror 144 is angularly disposed to reflect the light through the reproportioner 142 and onto the sensitive paper which is placed upon the glass 91. Other camera elements such as filters, diffusing screens, holders and the like may be slipped within the camera by means of the holder shown at 145.

After the paper or sensitive film has been exposed, it is removed from the pneumatic platen 93 by the arm 68 and fed into the developing or processing station 55 shown somewhat diagrammatically in FIGURE 20 and in more detail in FIGURES 21 through 24. The developing station consists of a tray 146 having a series of compartments therein 147, 148 and 149, to receive developing and paper processing solutions. Rollers 150, 151 are mounted in the developing station so that paper fed through the rollers will be moistened by the solution in each of the compartments. The paper will emerge through the slot 152 in the side of the machine as a completely processed article.

Figure 21:
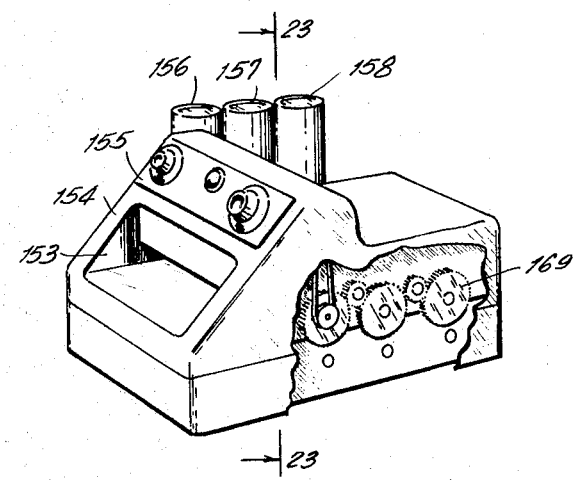
FIGURES 21 and 22 are somewhat isometric views, partly broken away, of a developing apparatus made in accordance with the present invention.
Figure 22:
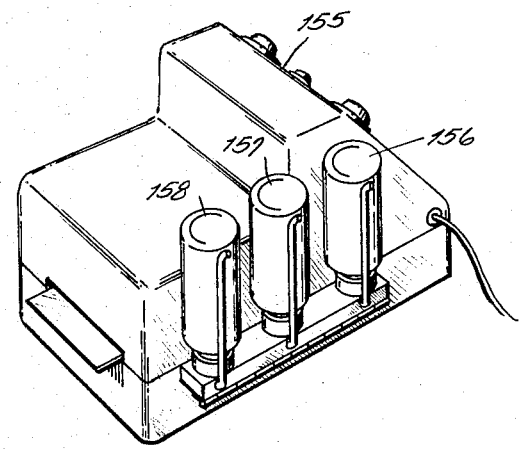
Figure 23:
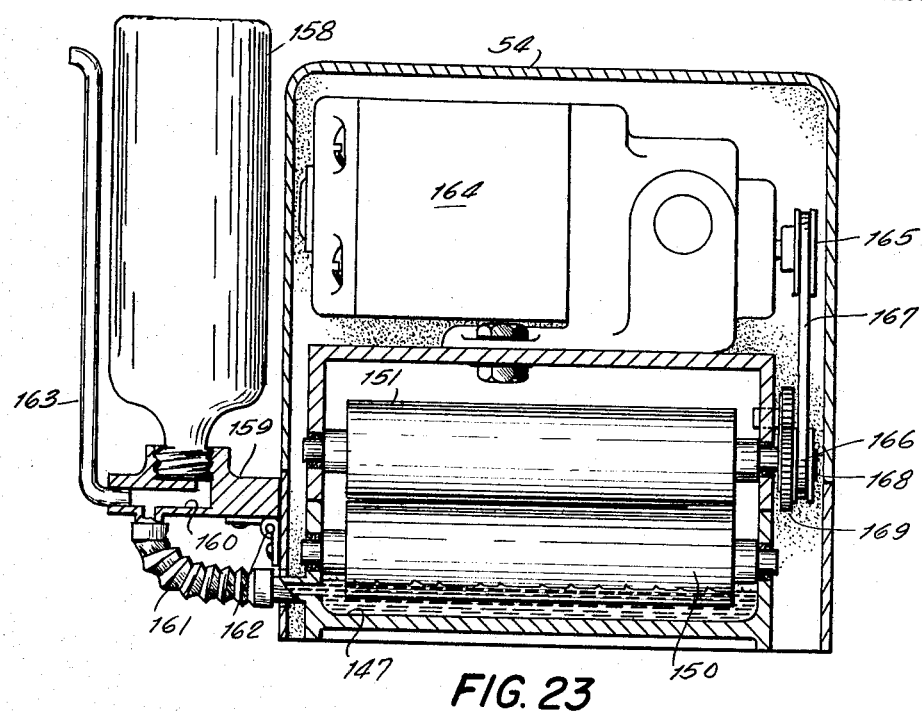
FIGURE 23 is a sectional view somewhat enlarged taken on line 23—23 in FIGURE 21.

Referring to FIGURES 21 and 22, there is shown one form of paper processing station according to the present invention. In this embodiment, the paper is fed into an opening 153 in the processer housing 154. A small control panel 155 is provided on the top of the housing 154 to regulate the operation of the device. A container is provided at the rear of the housing to feed a supply of each of the specific chemicals required for pressing the paper in the compartments 147, 148 and 149. The containers 156, 157 and 158, as shown in FIGURE 23, are screwed into a block 159 having three bores 160 each connected to a flexible hose 161 which in turn leads into one of the compartments. The position of the container 158 with respect to the bottom of the compartment is such that the liquid level is mainained as long as there is fluid in the container. The block 159 is hinged, as indicated at 162, to the housing 154. When the chemical solution within the compartment is exhausted or contaminated, the container 158 can be swung downwardly about the hinge 162 and the fluid within the compartment will drain out through the hose 161 and a small pipe 163 which communicates with the bore 160 in the block 159.

Figure 24:
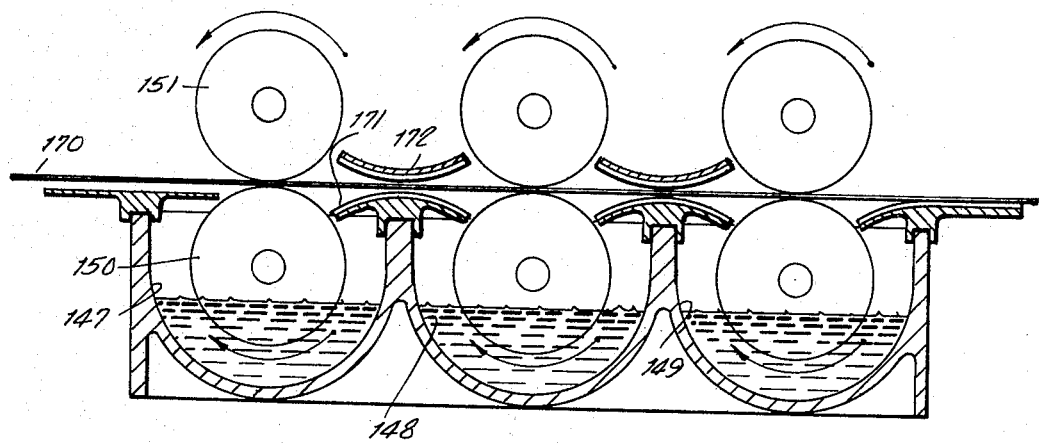
FIGURE 24 is a somewhat diagrammatic view in longitudinal section of the film or paper handling portion of the developing apparatus.

A small motor 164 is carried within the housing 154 and is provided with a drive pulley 165. The pulley 165 is coupled to a second pulley 166 by a belt 167. The pulley 166 is secured to a shaft 168 which in turn is the supporting shaft for the first roller 151. A gear train indicated at 169 couples all of the rollers together so that the motor 164 serves to drive all of the rollers when the film developing station is in operation. As shown in FIGURE 24, the paper 170 is driven between the rollers 150, 151 and is maintained on this path by guide members 171, 172 disposed between the said pairs of rollers. The guide member 171 further prevents splashing of the chemicals from one compartment to another, which might result in contamination of said chemicals.

Referring to FIGURES 25, 26 and 27, there is shown a further embodiment of the film processing and developing apparatus in which the chemicals are retained within individual containers 173, 174 and 175. Each of the containers is disposed below an individual tray compartment 176, 177 and 178. Fluids in the compartments 176, 177 and 178 drain directly into the containers 173, 174 and 175. A length of tubing 179 is provided for each of the containers and leads from the interior of the containers to one of three pumps 180, 181 and 182. Fluids coming from the pumps 180, 181, 182 is led into a nozzle 183 through a small pipe 184. The nozzles 183 are disposed above the rollers 151 and are provided with openings 185 through which the chemicals from the container are directed onto the rollers 151 and thence onto the paper 170. The paper emerges from the slot 153 in the developing station as a processed article. A motor 186 is provided within the developing station to drive the pumps 180, 181 and 182, as indicated in FIGURE 25.

Figure 28:
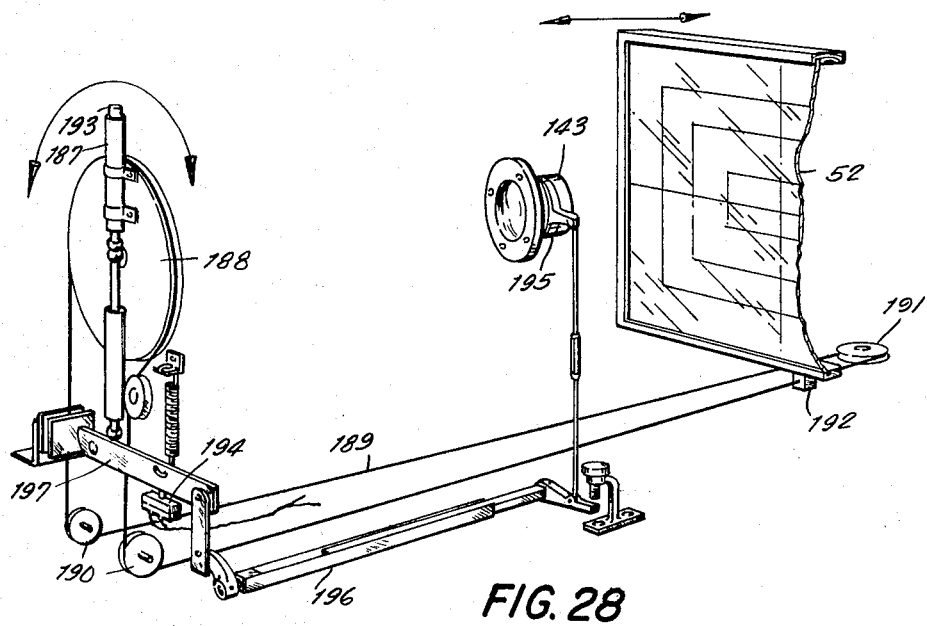
FIGURE 28 is a somewhat isometric view, with certain parts omitted for the sake of clarity, of the control mechanism of the present invention.
Figure 29:
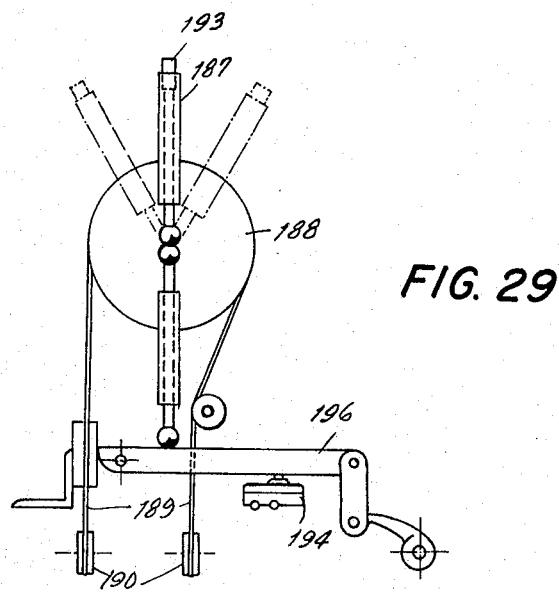
FIGURE 29 is an end view of the mechanism shown in FIGURE 28.

Referring to FIGURES 28 and 29, there is shown the manner in which the operator controls the camera. The machine is provided with a control lever 187 which is attached to a large pulley 188. The control lever 187 may be swung through an arc for the purpose of rotating the pulley 188. As the pulley is rotated, it drives the cable 189 which is led around pulleys 190 and 191. The copy holding station 52 is secured to the cable 189, as indicated at 192, and, as the cable is moved by the operator, the copy station will move toward or way from the camera lens 143. The control lever 187 is further provided with a button 193 which is depressed by the operator and which, in addition to closing the switch 194 to control the lights 125, and opens the diaphragm 195 of the camera lens 143 by means of the linkage 196. The copy holding station 52 is moved into the proper focus and adjusted with respect to size in accordance with the requirement of the job. When the button 193 is released, the diaphragm 195 automatically closes and the copy station is locked in place by the brake means indicated at 197.

Referring to FIGURE 30, there is shown in more detail, the paper handling station 54 of the present invention. The filter 63 in this embodiment is provided with an enlarging glass assembly 198 secured to the top thereof to enable the operator to see the interior of the paper handling station, and more specifically, the focusing screen 95 in more detail. The opaque slide 64 is normally disposed in the position shown in FIGURE 30, except when light sensitive paper capable of being exposed by the light which can pass through the filter 63 is being employed in the camera.

The material handling panel 69 shown in FIGURE 30 is provided with a plurality of pleats 199 on either side of the operating handle 72 so that the said handle can be moved laterally. A swivel mount 200 is also provided on the panel 69 around the operating handle 72 so that the pick-up tubes 75 on the end dome 73 can be raised and lowered.

Where it is desired to provide manual access means for the material handling station, the structure shown in FIGURES 31 through 34 may be added or substituted in the panel 69. The manual access structure consists of a two piece frame 201, 202 which is secured to the pleated panel 199 in a light proof manner. The frame members 201, 202 serve as a mount for a plurality of resilient membranes 203, 203a, 203b and 203c. The membranes are substantially triangular in shape and provided with a small arcuate opening 204 in the center of the hypotenuse of each of the membranes. The membranes 203 are each secured within the frame 201, 202 in such manner that the arcuate portion is disposed toward the center of the assembly and the right angle corners of each of the membranes are secured to one of the right angle corners of the frames 201, 202. A membrane support plate 205 completes the assembly of the manual access device and consists of a rectangular rigid sheet 206 having an opening 207 therein of a size large enough to permit the operator's hand to pass therethrough.

Figure 35:
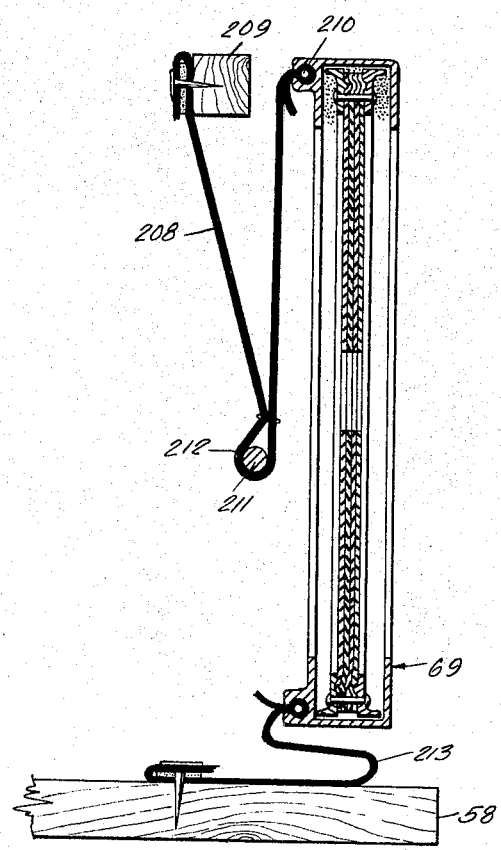
FIGURE 35 is a cross sectional view of the manual access panel shown in FIGURES 31 and 34.
Figure 36:
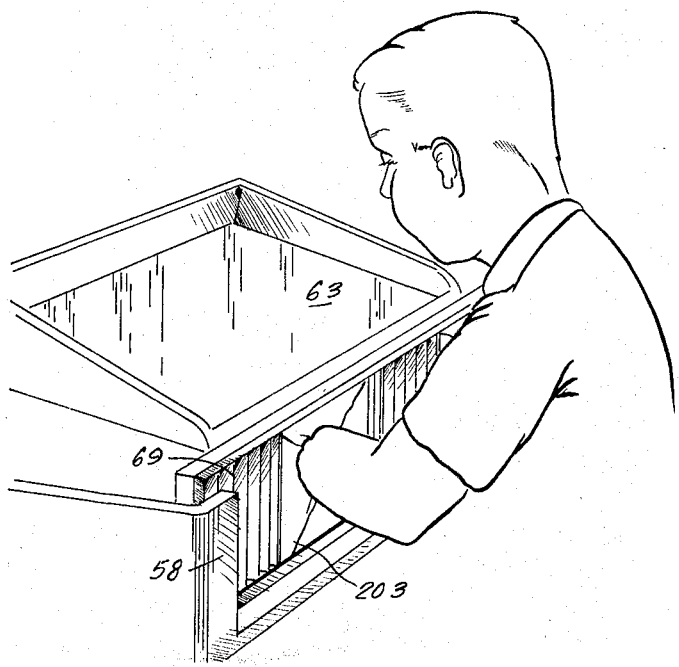
FIGURE 36 illustrates the use of the manual access panel of FIGURES 31 and 35.

The arcuate cut-out portions 204 of the membranes overlap each other in such a manner that when the access means is in its normal state, a light proof closure is provided in the panel 69. When the operator thrusts his hand through the frame 201, the membranes 203, 203c stretch apart so that the operator's hand and arm can be thrust into the material handling station 54, in the manner shown in FIGURE 36. In order to facilitate the motion of the operator's arm, the panel 69 is preferably supported in the manner shown in FIGURE 35. In this drawing, it will be seen that a light proof sheet 208 is transversely carried by the housing 58 behind the panel 69. One end of the sheet is secured to a bar 209 and the other end of the sheet is secured to the top of the panel 69, as indicated at 210. A small rod or weight 211 is disposed within a fold 212 of the sheet 208 for the purpose of holding the sheet behind the openings in the membranes 203, 203c, should light leak through the said openings when the operator's hand is not thrust through the access member. When the operator thrusts his hand through the panel, he reaches under the fold 212 and lifts it so that it is out of his way as he works. On the other hand, the panel 69 may be raised or lowered by the operator without restriction by reason of the fold 212 of the sheet 208.

A second sheet of opaque material 213 is secured between the bottom of the panel 69 and the housing 58 to prevent light from leaking in under the panel when it is lifted or moved down during normal operation of the device. It will be understood that when the operator removes his hand from the manual access member, the resilient membranes 203, 203c will snap back to their original position and provide a light proof seal for the interior of the housing 58. The membranes 203, 203c may be made of thin sheets of rubber, neoprene or the like.

Figure 37:
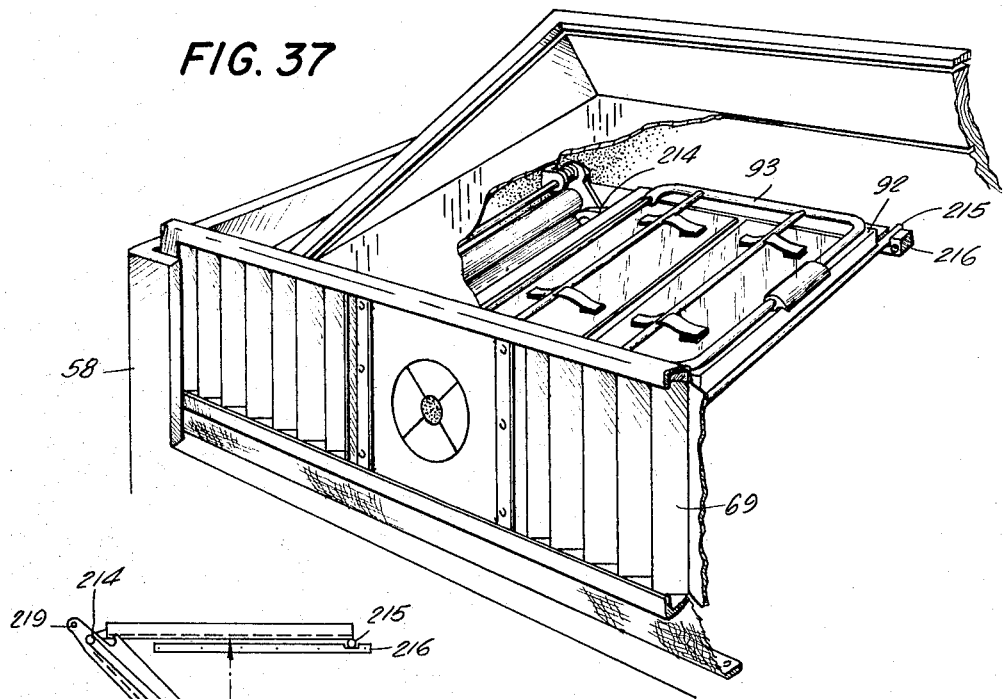
FIGURE 37 is a fragmentary somewhat isometric view of the paper handling station partly broken away to show the interior thereof.
Figure 38:
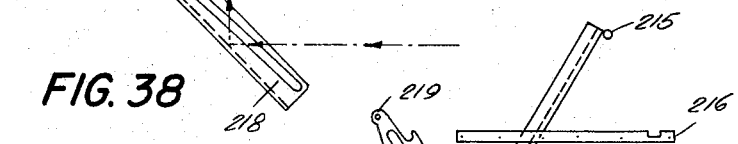
FIGURES 38, 39 and 40 show the steps in producing wrong reading or reverse prints using the present invention.
Figure 39:
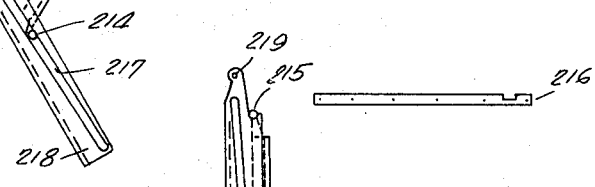
Figure 40:
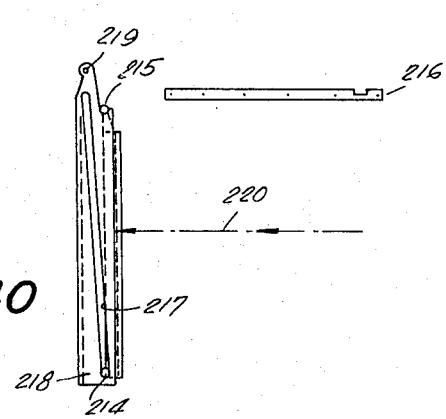
Figure 41:
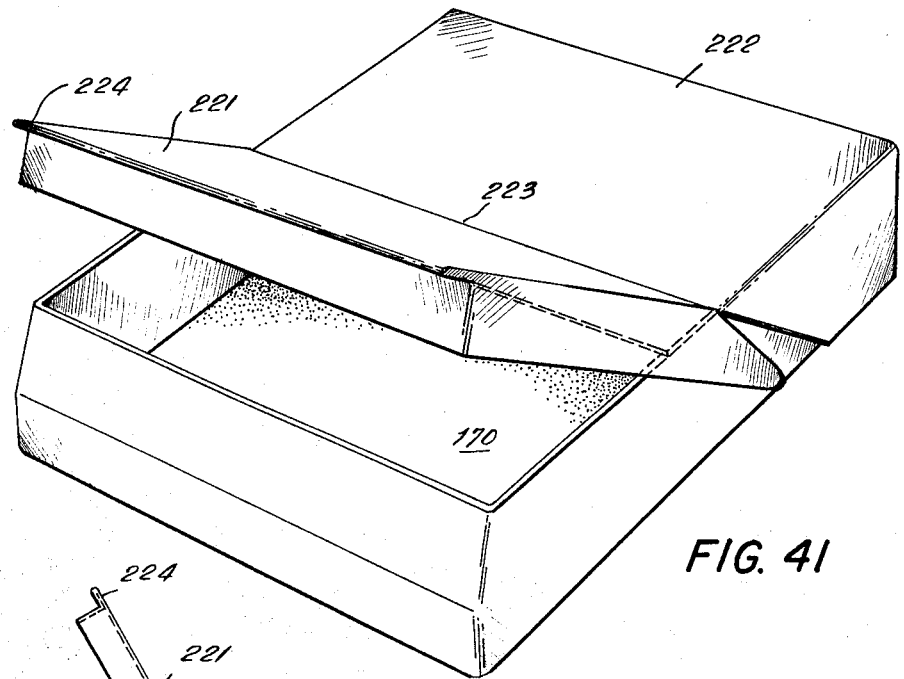
FIGURES 41 through 44 illustrate a light proof paper box made in accordance with the present invention.
Figure 42:
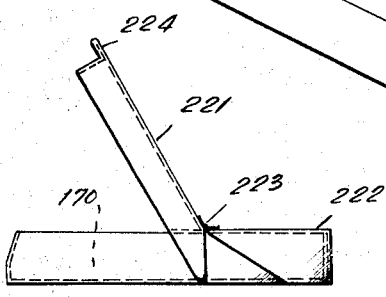

It is sometimes desired to take a wrong reading photograph of copy as, for example, in preparing plates for lithography. FIGURES 37 through 40 illustrates how the present device is adapted to achieve this purpose. Referring to FIGURE 37, the interior of the paper handling station can be seen in the cut-away portion thereof. It will be observed that the frame 92 which supports the glass 91 disposed on the focal plane of the camera and the pressure platen 93 is swingably secured at 214. A small rod 215 underlies the free end of the frame 92 during normal operations of the camera. The end of the rod 215 is supported by spaced brackets 216 within the housing 58. When it is desired to take a reversed or wrong reading picture, the frame 92 is lifted in the manner shown in FIGURE 39. The pivot point 214 of the frame thereupon slides down an elongated slot 217 which is cut into spaced arms 218 carried on either side of the mirror 144 within the camera. The frame 92 finally reaches the position shown in FIGURE 40 and the entire assembly, including the mirror 144, is swung into a vertical position upon the pivot 219, thereby bringing the light sensitive paper into a position normal to the optical axis 220 of the camera. The image recorded upon the sensitive paper in this position will be a reverse image, in accordance with the well known laws of optics. The frame 92 can subsequently be raised to the position shown in FIGURE 37 for removal of the light sensitive paper and processing thereof, as hereinabove more fully described.

Figure 43:
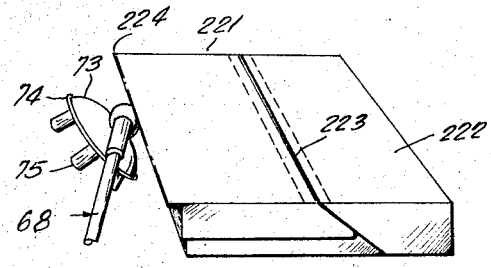
Figure 44:
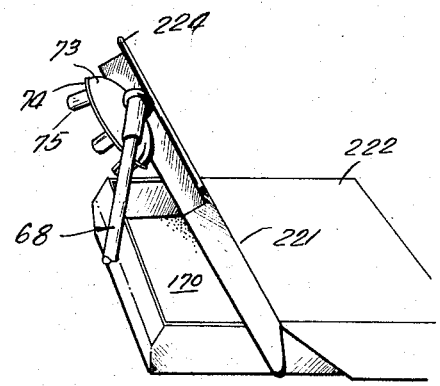

During exposure of the light sensitive film or paper, it is important that the stored paper within the machine not be exposed. Accordingly, the paper 170 is packaged in a special holder, best shown in FIGURES 41 through 44, having a light excluding lid 221. The lid 221 is hinged to the top of the holder 222, as indicated at 223. The front of the lid 221 is further provided with a flange 224, whereby the lid 221 may be lifted by the paper handling arm 68 in the manner shown in FIGURES 43 and 44. With the lid 221 raised, the arm 68 may be slipped into the folder 222 and a single sheet removed. When the arm 68 is withdrawn from the holder 222, the lid falls into place, as illustrated in FIGURE 43, to provide a light excluding structure which will prevent the stored paper 170 from becoming accidentally exposed.

One of the many photographic operations possible with the above described device would be as follows:

The machine is wheeled into an area where it is to be used; the electrical service established and a suitable piece of copy placed on the front copy easel 52. The copy holding station 52 is next moved to the proper location on the ways 56, which location may be previously determined by the operator and identified by means of the scale 225 inscribed upon the ways. The focusing button 193 is then depressed for the purpose of energizing the lamps 134 and opening the diaphragm 195. By moving the lever 187 back and forth, the image can be brought into sharp focus upon the screen 95 of the pressure platen 93. The button 193 is then released and a sheet of paper 170 removed from the holder 222. The paper is inserted between the pressure platen 93 and the glass 91 and oriented as hereinabove described. The platen 93 is then closed and the camera ready for an exposure. The exposure is then made in accordance with normal camera techniques employing the lights and the camera shutter (not shown) to expose the paper 170. After the exposure has been made, the pressure platen 93 is opened, the paper 170 removed from beneath the platen and fed into the paper processing station 55. The paper passes between the rollers 150, 151, and emerges from the slot as a finished photograph or plate.

In the production of photographic copies it is important to use papers having long shelf life. However, such papers generally require developing processes which demand substantial time intervals. The developing chemicals used in the present invention, therefore, are adapted to process paper of long shelf life properties in a minimum of time.

One preferred series of solutions in accordance with the present invention consists of a first solution made up of 5 grams of Elon, 45 grams of Hydroquinone, 50 grams of Sodium Sulphite, 2 grams of Potassium Bromide, 5 grams of Citric Acid and water to make one (1) liter. The liquid in the second tank is made up of 50 grams of Hydroxide, 10 grams of Sodium Carbonate, 100 milligrams of Benzotriazole, 2 grams of Potassium Bromide and water to make one (1) liter. The solution in the third tank contains 250 grams of Potassium Iodide, 30 milliliters of Glacial Acetic Acid and water to make one (1) liter.

It will be apparent from the foregoing that there has been provided a versatile self-contained photocopying and photoprinting device which is capable of a large number of photographic operations in a minimum of space and with a greatly reduced time requirement.

Having thus fully described the invention, what is claimed as new and desired to be secured by Letters Patent of the United States, is:

1. A photocopying device comprising a base, a copy holding assembly carried by the base, a housing carried by the base and spaced from the copy holding assembly, a photographic camera within the housing and adapted to photograph copy in the copy holder, means to store a supply of light sensitive material within the housing, a sensitive material holding frame disposed in the camera focal plane comprising a transparent support, a frosted focusing screen swingably carried above the transparent support to receive the sensitive material thereunder, at least one transparent fluid filled bag secured to the focusing screen and means to hold the said screen against the transparent sheet to retain the sensitive material therebetween during exposure, means to move the light sensitive material from the storage means into the focal plane of the camera for exposure, a developing assembly within the housing in which the sensitive material holding frame is swingably and horizontally secured within the housing, a mirror disposed in the camera to direct light coming through the camera lens upwardly upon the material in the frame and means to selectively swing the frame in front of the mirror to receive light directly from the camera lens and means to transport the exposed sensitive material through the developing assembly to produce a finished photographic print.

2. A photocopying device comprising a base, a copy holding assembly carried by the base, a housing carried by the base and spaced from the copy holding assembly, a photographic camera within the housing adapted to photograph copy in the copy holder, means to store a supply of light sensitive material within the housing, means to move the light sensitive material from the storage means into the focal plane of the camera for exposure, a developing assembly within the housing in which the housing is provided with manual access means to the interior thereof comprising a panel, a front rectangular frame member in said panel, a rear rectangular frame member, a plurality of substantially triangular opaque sheets of resilient material carried between the frame members with their hypotenuses diagonally disposed across the frames and overlapping each other to form a light proof closure and a rigid rectangular sheet behind the resilient sheets, said rigid sheet having an opening therein of a size to permit a hand to be thrust therethrough and a transverse light proof sheet of material secured along one edge to the housing and along its opposite edge to the panel, said sheet being doubled back upon itself to form a fold of material overlying the opening in the rigid sheet and a weight carried within the fold to hold it in its light blocking position and means to transport the exposed sensitive material through the developing assembly to produce a finished photographic print.

References Cited by the Examiner

UNITED STATES PATENTS

| | | | |
|---|---|---|---|
| 380,136 | 3/1888 | Riedel | 95—91 |
| 717,021 | 12/1902 | Pollak | 95—89 |
| 988,183 | 3/1911 | Gallagher | 95—13 |
| 1,780,701 | 11/1930 | Crane | 95—76 |
| 1,816,290 | 7/1931 | Klimis | 95—14 |
| 1,831,152 | 11/1931 | Weisker | 88—24 |
| 2,117,279 | 5/1938 | Anson | 95—14 |
| 2,184,223 | 12/1939 | Horman | 95—4.5 |
| 2,223,148 | 11/1940 | Fullerton | 88—24 |
| 2,314,272 | 3/1943 | Grudin | 95—4.5 |
| 2,353,512 | 7/1944 | Simmon | 88—24 |
| 2,420,719 | 5/1947 | Park | 95—20 |
| 2,504,039 | 4/1950 | O'Leary | 88—1 |
| 2,664,038 | 12/1953 | Canham | 95—14 |
| 2,881,686 | 4/1959 | Ruhle | 95—49 X |
| 3,040,640 | 6/1962 | Abel | 95—13 X |

FOREIGN PATENTS

| | | |
|---|---|---|
| 384,073 | 1/1908 | France. |
| 713,929 | 8/1931 | France. |

JOHN M. HORAN, *Primary Examiner.*